(12) United States Patent
Antao et al.

(10) Patent No.: US 8,645,273 B2
(45) Date of Patent: Feb. 4, 2014

(54) SYSTEMS AND METHODS FOR PROVIDING A VENDING NETWORK

(75) Inventors: Leonard Antao, Smyrna, GA (US); Gerard E. Insolia, Atlanta, GA (US); Stephen Merwarth, Cumming, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 454 days.

(21) Appl. No.: 12/035,181

(22) Filed: Feb. 21, 2008

(65) Prior Publication Data

US 2009/0216575 A1 Aug. 27, 2009

(51) Int. Cl.
G06Q 40/00 (2012.01)
G06F 7/08 (2006.01)
G06F 17/00 (2006.01)

(52) U.S. Cl.
USPC .............................. 705/42; 235/381; 700/231

(58) Field of Classification Search
USPC ................ 705/35–45; 235/381; 700/231–244
See application file for complete search history.

(56) References Cited

U.S. PATENT DOCUMENTS

| | | | | |
|---|---|---|---|---|
| 4,412,292 | A | * | 10/1983 | Sedam et al. ................ 700/241 |
| 4,876,441 | A | | 10/1989 | Hara et al. |
| 5,091,713 | A | * | 2/1992 | Horne et al. ................ 340/541 |
| 5,352,876 | A | * | 10/1994 | Watanabe et al. ........... 235/381 |
| 5,445,295 | A | * | 8/1995 | Brown ............................ 221/3 |
| 5,450,938 | A | * | 9/1995 | Rademacher ............... 194/206 |
| 5,619,024 | A | * | 4/1997 | Kolls ............................ 235/381 |
| 5,637,845 | A | * | 6/1997 | Kolls ............................ 235/381 |
| 5,680,611 | A | | 10/1997 | Rail et al. |
| 5,682,027 | A | | 10/1997 | Bertina et al. |
| 5,828,044 | A | | 10/1998 | Jun et al. |
| 5,844,808 | A | * | 12/1998 | Konsmo et al. ............. 700/244 |

(Continued)

FOREIGN PATENT DOCUMENTS

| | | |
|---|---|---|
| JP | 2002507805 | 3/2002 |
| JP | 2003196715 | 7/2003 |
| JP | 2007293614 | 8/2007 |
| JP | 2007004483 | 11/2007 |

OTHER PUBLICATIONS

"International Vending Management Commits to a Long-Term Contract with USA Technologies", PR Newswire [New York] Aug. 8, 2002, pp. 1-2.*

(Continued)

*Primary Examiner* — Mohammad Z Shaikh
(74) *Attorney, Agent, or Firm* — Sutherland Asbill & Brennan LLP

(57) ABSTRACT

Embodiments of the invention can implement systems and methods for providing a vending network. In one embodiment, a system for providing a vending network can be provided. The system can include at least one transaction-type device associated with a vending machine, wherein the at least one transaction-type device is operable to facilitate cash transactions and/or cashless transactions associated with one or more products or services offered by the vending machine. The system can also include at least one server operable to communicate with the at least one transaction-type device, wherein the at least one server is operable to receive data associated with the transactions. Furthermore, the system can include at least one vend settlement server operable to communicate with the at least one server, wherein the at least one vend settlement server can settle some or all of the transactions.

14 Claims, 8 Drawing Sheets

(56) References Cited

U.S. PATENT DOCUMENTS

| | | | |
|---|---|---|---|
| 5,880,454 A | 3/1999 | Monicault | |
| 5,889,266 A | 3/1999 | Schrenk | |
| 5,924,081 A * | 7/1999 | Ostendorf et al. | 705/30 |
| 5,930,771 A * | 7/1999 | Stapp | 705/28 |
| 5,959,869 A * | 9/1999 | Miller et al. | 700/231 |
| 6,012,635 A | 1/2000 | Shimada et al. | |
| 6,056,194 A * | 5/2000 | Kolls | 235/381 |
| 6,085,983 A | 7/2000 | Curry et al. | |
| 6,095,412 A | 8/2000 | Bertina et al. | |
| 6,115,649 A * | 9/2000 | Sakata | 700/241 |
| 6,119,934 A * | 9/2000 | Kolls | 235/381 |
| 6,145,739 A | 11/2000 | Bertina et al. | |
| 6,152,365 A * | 11/2000 | Kolls | 235/381 |
| 6,169,483 B1 | 1/2001 | Ghaffari et al. | |
| 6,181,981 B1 * | 1/2001 | Varga et al. | 700/236 |
| 6,182,900 B1 | 2/2001 | Wiehler | |
| 6,254,006 B1 | 7/2001 | Mish | |
| 6,321,985 B1 * | 11/2001 | Kolls | 235/381 |
| 6,331,972 B1 | 12/2001 | Harris et al. | |
| 6,339,731 B1 * | 1/2002 | Morris et al. | 700/236 |
| 6,351,688 B1 * | 2/2002 | Nichols et al. | 700/241 |
| 6,366,220 B1 | 4/2002 | Elliott | |
| 6,382,507 B2 | 5/2002 | Schilling | |
| 6,390,375 B2 | 5/2002 | Kayanakis | |
| 6,414,441 B1 | 7/2002 | Fries et al. | |
| 6,418,326 B1 | 7/2002 | Heinonen et al. | |
| 6,424,884 B1 | 7/2002 | Brooke, Jr. et al. | |
| 6,427,912 B1 * | 8/2002 | Levasseur | 235/381 |
| 6,457,038 B1 * | 9/2002 | Defosse | 709/200 |
| 6,462,644 B1 * | 10/2002 | Howell et al. | 340/5.92 |
| 6,505,095 B1 * | 1/2003 | Kolls | 700/244 |
| 6,547,040 B2 | 4/2003 | Goodwin, III | |
| 6,571,150 B2 * | 5/2003 | Arai et al. | 700/236 |
| 6,604,086 B1 | 8/2003 | Kolls | |
| 6,604,679 B2 | 8/2003 | Morooka et al. | |
| 6,622,914 B2 | 9/2003 | Hosogoe | |
| 6,640,214 B1 | 10/2003 | Nambudiri et al. | |
| 6,647,256 B1 | 11/2003 | Stewen et al. | |
| 6,663,006 B2 | 12/2003 | Mullins et al. | |
| 6,732,923 B2 | 5/2004 | Otto | |
| 6,748,296 B2 | 6/2004 | Banerjee et al. | |
| 6,752,321 B1 | 6/2004 | Leaming | |
| 6,755,341 B1 | 6/2004 | Wong et al. | |
| 6,757,585 B2 * | 6/2004 | Ohtsuki et al. | 700/237 |
| 6,763,094 B2 | 7/2004 | Conn et al. | |
| 6,771,981 B1 | 8/2004 | Zalewski et al. | |
| 6,776,339 B2 | 8/2004 | Piikivi | |
| 6,799,726 B2 | 10/2004 | Stockhammer | |
| 6,811,078 B2 | 11/2004 | Workens | |
| 6,816,083 B2 | 11/2004 | Brandt | |
| 6,823,188 B1 | 11/2004 | Stern | |
| 6,836,468 B1 | 12/2004 | O'Toole et al. | |
| 6,836,472 B2 | 12/2004 | O'Toole et al. | |
| 6,853,605 B2 | 2/2005 | Fujisawa et al. | |
| 6,857,566 B2 | 2/2005 | Wankmueller | |
| 6,859,650 B1 | 2/2005 | Ritter | |
| 6,892,052 B2 | 5/2005 | Kotola et al. | |
| 6,898,440 B2 | 5/2005 | Chen et al. | |
| 6,934,689 B2 | 8/2005 | Ritter et al. | |
| 6,988,657 B1 | 1/2006 | Singer et al. | |
| 6,993,501 B1 | 1/2006 | Zhao | |
| 7,003,495 B1 | 2/2006 | Burger et al. | |
| 7,012,504 B2 | 3/2006 | Tuttle | |
| 7,016,879 B2 | 3/2006 | Harada | |
| 7,020,680 B2 | 3/2006 | Defosse | |
| 7,027,808 B2 | 4/2006 | Wesby | |
| 7,051,924 B2 | 5/2006 | Nakano et al. | |
| 7,054,845 B2 | 5/2006 | Oshima et al. | |
| 7,063,251 B2 | 6/2006 | Namekawa et al. | |
| 7,069,251 B1 | 6/2006 | Bartz et al. | |
| 7,070,112 B2 | 7/2006 | Beenau et al. | |
| 7,076,328 B2 | 7/2006 | Piikivi | |
| 7,076,329 B1 * | 7/2006 | Kolls | 700/232 |
| 7,079,832 B2 | 7/2006 | Zalewski et al. | |
| 7,085,556 B2 | 8/2006 | Offer | |
| 7,097,108 B2 | 8/2006 | Zellner et al. | |
| 7,098,770 B2 | 8/2006 | Charrat et al. | |
| 7,100,835 B2 | 9/2006 | Selker | |
| 7,104,458 B2 | 9/2006 | Schmuck et al. | |
| 7,110,792 B2 | 9/2006 | Rosenberg | |
| 7,110,954 B2 * | 9/2006 | Yung et al. | 705/26.1 |
| 7,117,012 B1 | 10/2006 | Kolbeck et al. | |
| 7,119,659 B2 | 10/2006 | Bonalle et al. | |
| 7,124,955 B2 | 10/2006 | Lasch et al. | |
| 7,127,236 B2 | 10/2006 | Khan et al. | |
| 7,133,659 B2 | 11/2006 | Zalewski et al. | |
| 7,146,344 B2 | 12/2006 | Wankmueller | |
| 7,147,149 B2 | 12/2006 | Giraldin et al. | |
| 7,147,151 B2 | 12/2006 | Lasch et al. | |
| 7,155,199 B2 | 12/2006 | Zalewski et al. | |
| 7,156,301 B1 | 1/2007 | Bonalle et al. | |
| 7,181,501 B2 * | 2/2007 | Defosse | 709/217 |
| 7,194,422 B1 | 3/2007 | Killick | |
| 7,324,972 B1 | 1/2008 | Oliver et al. | |
| 7,455,223 B1 * | 11/2008 | Wilson et al. | 235/381 |
| 7,464,867 B1 * | 12/2008 | Kolls | 235/381 |
| 7,693,602 B1 * | 4/2010 | Kolls | 700/237 |
| 7,810,721 B2 * | 10/2010 | Powell et al. | 235/381 |
| 7,865,430 B1 * | 1/2011 | Kolls | 705/39 |
| 8,103,380 B2 * | 1/2012 | Cheng et al. | 700/244 |
| 8,191,779 B2 * | 6/2012 | Illingworth et al. | 235/381 |
| 8,484,068 B2 * | 7/2013 | Godwin et al. | 705/7.31 |
| 2001/0032207 A1 | 10/2001 | Hartley et al. | |
| 2002/0016819 A1 | 2/2002 | Kolls | |
| 2002/0026402 A1 | 2/2002 | Okamura | |
| 2002/0032638 A1 | 3/2002 | Arora et al. | |
| 2002/0052754 A1 | 5/2002 | Joyce et al. | |
| 2002/0059148 A1 * | 5/2002 | Rosenhaft et al. | 705/77 |
| 2002/0077178 A1 | 6/2002 | Oberberger et al. | |
| 2002/0077889 A1 | 6/2002 | Kolls | |
| 2002/0077893 A1 | 6/2002 | Wolf et al. | |
| 2002/0087454 A1 | 7/2002 | Calo et al. | |
| 2002/0099608 A1 * | 7/2002 | Pons et al. | 705/21 |
| 2002/0120846 A1 | 8/2002 | Stewart et al. | |
| 2002/0156727 A1 * | 10/2002 | LeVake et al. | 705/39 |
| 2002/0174030 A1 | 11/2002 | Praisner et al. | |
| 2002/0188378 A1 * | 12/2002 | Sufer | 700/236 |
| 2003/0018572 A1 | 1/2003 | Beschie et al. | |
| 2003/0033205 A1 | 2/2003 | Nowers et al. | |
| 2003/0050930 A1 | 3/2003 | Mosher et al. | |
| 2003/0055727 A1 * | 3/2003 | Walker et al. | 705/14 |
| 2003/0074106 A1 | 4/2003 | Butler | |
| 2003/0083908 A1 | 5/2003 | Steinmann | |
| 2003/0135410 A1 | 7/2003 | Chapman et al. | |
| 2003/0149662 A1 | 8/2003 | Shore | |
| 2003/0158625 A1 * | 8/2003 | Carstens et al. | 700/236 |
| 2003/0200212 A1 | 10/2003 | Benson et al. | |
| 2004/0002906 A1 | 1/2004 | Von Drehnen et al. | |
| 2004/0069845 A1 | 4/2004 | Goldstein et al. | |
| 2004/0133653 A1 * | 7/2004 | Defosse et al. | 709/217 |
| 2004/0153421 A1 | 8/2004 | Robinson | |
| 2004/0236648 A1 | 11/2004 | Yip et al. | |
| 2005/0127167 A1 | 6/2005 | Nakajima | |
| 2005/0248459 A1 | 11/2005 | Bonalle et al. | |
| 2006/0111956 A1 | 5/2006 | Whitesage | |
| 2006/0122881 A1 | 6/2006 | Walker et al. | |
| 2006/0129504 A1 | 6/2006 | Nakajima | |
| 2006/0287953 A1 | 12/2006 | Chauhan | |
| 2007/0012759 A1 | 1/2007 | Allarea et al. | |
| 2007/0035401 A1 | 2/2007 | Bartz | |
| 2007/0043770 A1 | 2/2007 | Goodrich et al. | |
| 2007/0138265 A1 * | 6/2007 | Powell et al. | 235/381 |
| 2007/0262139 A1 | 11/2007 | Fiebiger et al. | |
| 2008/0033880 A1 | 2/2008 | Fiebiger et al. | |
| 2008/0040777 A1 | 2/2008 | Aihara et al. | |
| 2009/0055281 A1 * | 2/2009 | DeMedio et al. | 705/21 |
| 2009/0216665 A1 | 8/2009 | Merwarth et al. | |
| 2009/0216666 A1 | 8/2009 | Antao et al. | |
| 2009/0216675 A1 | 8/2009 | Antao et al. | |

OTHER PUBLICATIONS

"USA Technologies' Cashless Solution to Be Offered by Blackboard", Wireless News, Jul. 19, 2007, pp. 1-2.*

(56) References Cited

OTHER PUBLICATIONS

"Motient and USA Technologies Join Forces to Bring 10,000 Vending Machines Online", PR Newswire [New York], Jan. 12, 2004, pp. 1-2.*
Kavasana, Michael L. "Rising consumer preference for cashless purchasing creates new opportunities", Automatic Merchandiser 47.4, Apr. 2005, pp. 1-6.*
Final Office Action dated May 6, 2011 for U.S. Appl. No. 12/035,191.
Final Office Action dated Nov. 3, 2010 for U.S. Appl. No. 12/035,191.
International Search Report and Written Opinion for International Application No. PCT/US09/33140 mailed on May 19, 2011.

* cited by examiner

SYSTEMS AND METHODS FOR PROVIDING A VENDING NETWORK

TRADEMARKS

COCA-COLA® is a registered trademark of The Coca-Cola Company, Atlanta, Ga., U.S.A. Other names used herein may be registered trademarks, trademarks or product names of The Coca-Cola Company or other companies.

TECHNICAL FIELD OF THE INVENTION

This invention relates to a vending network, and more particularly to systems and methods for providing a vending network.

BACKGROUND OF THE INVENTION

In the vending industry, coins and bills have been one manner used to pay for vended goods and services. In this regard, when a vending account is to be settled, coins and bills can be collected from vending equipment, and the coins and bills can be reconciled with the physical inventory to determine what was sold and how much money was collected.

In recent years, cashless payments, for example credit cards, have become an option for payments. In this regard, a user of vending equipment may now be able to use cashless payments, in addition to coin and bill payments, for vended goods and services. In the case of cashless payments, a cashless payment can typically be processed by a third party server. Subsequently, an electronic funds transfer (EFT) can remit the cashless payment received, less any transaction processing fees and/or other fees, to an operator of the vending equipment. Even so, in some instances, the EFT may not reconcile an actual vend event with an associated actual cashless transaction. To further complicate matters, the vend sale amount may not match the EFT amount since fees may be deducted from the cashless funds, and oftentimes, the EFT transactions may represent an aggregated batch or bundling of multiple transactions, thus obscuring each individual vend transaction.

The processing of cashless transactions can cause numerous problems for processors handling cashless transactions, vendors offering goods and/or services by way of a vending machine accepting cashless transactions, and others involved in the cashless transaction process. For example, in one settlement process, coins, bills, and cashless transactions may not be timely reconciled with inventory since many cashless transactions may still be stored in a vending machine or other associated data storage device. In other instances, cashless transactions may still be en route to a third party server, not settled yet and/or aggregated with little or no transaction level detail. Oftentimes, only after vend settlement is initiated, may an associated EFT transaction occur, which can further frustrate the settlement process because of the aggregated nature of EFTs.

In addition, the routing of cashless transactions to one or more third party servers can also create an accountability problem. In some instances, multiple items can be vended from a vending machine, and one or more customers may attempt to pay with a cashless implement, such as a credit or debit card. However, in such instances, there is no guarantee that a vending equipment operator will ever see funds for vends paid for by cashless transactions, and no further guarantee that a customer was correctly charged for the vended goods and/or services. As such, there may be little or no accountability as to when vends occurred or what was charged to the customer. Moreover, there may be little or no accountability as to whether a customer was timely and accurately charged, and little or no assurance that a vending equipment operator timely received the correct funds for vends paid for by cashless transactions.

Furthermore, a problem exists in auditing third party servers to verify accuracy and/or correctness of cashless transactions. In this regard, cashless transaction vending can lack oversight, accountability, auditing controls, and the ability to control how a device in the vending equipment operates and how data is communicated with or between various servers or other data processing devices.

Another problem occurs when route personnel attempt to reconcile transaction amounts and inventory at a vending equipment location. In some instances, the amount of bills, coins, cashless vends, and inventory must be known at the same point in time. As related to cashless transactions, this means knowing what the value of each transaction is without any fees removed, knowing which of the cashless transactions have been settled, and also knowing which of the settled cashless transactions have a corresponding EFT record indicating that an operator of the vending equipment has been paid for the cashless transactions. Without this level of detail, it may be unlikely that an accurate or timely vending equipment settlement can be performed without error across multiple vending equipment locations. For vending equipment in global locations, the settlement process may not be performed efficiently.

Therefore, a need exists for systems and methods for providing a vending network.

SUMMARY OF THE INVENTION

Some or all of the above needs can be addressed by various embodiments of the invention. Embodiments of the invention can provide systems and methods for providing a vending network.

In one embodiment, a system for providing a vending network can be implemented. The system can include at least one transaction-type device associated with a vending machine, wherein the at least one transaction-type device is operable to facilitate cash transactions and/or cashless transactions associated with one or more products or services offered by the vending machine. The system can also include at least one server operable to communicate with the at least one transaction-type device, wherein the at least one server is operable to receive data associated with the transactions. Furthermore, the system can include at least one vend settlement server operable to communicate with the at least one server, wherein the at least one vend settlement server can settle some or all of the transactions.

In another embodiment, a method for providing a vending network can be implemented. The method can include receiving inputs for cash transactions and/or cashless transactions from a plurality of transaction-type devices associated with respective vending machines. In addition, the method can include transmitting transaction data associated with some or all of the transactions to at least one server. Moreover, the method can include settling some or all of the transactions via at least one vend settlement server.

In yet another embodiment, a system for providing a vending network can be implemented. The system can include at least one transaction-type device associated with a vending machine, wherein the at least one transaction-type device is operable to facilitate cash transactions and/or cashless transactions associated with one or more products or services offered by the vending machine. In addition, the system can include at least one server operable to communicate with the at least one transaction-type device, wherein the at least one server is operable to receive data associated with the transactions and is further operable to associate a unique identifier with each of the transactions. Moreover, the system can include at least one vend settlement server operable to communicate with the at least one server, wherein the at least one vend settlement server can settle some or all of the transactions.

In an additional embodiment, a method for providing a vending network can be implemented. The method can include receiving inputs for cash transactions and/or cashless transactions from a plurality of transaction-type devices associated with respective vending machines. The method can also include transmitting transaction data associated with some or all of the transactions to at least one server. Further, the method can include associating a respective unique identifier with some or all of the transactions. Moreover, the method can include settling some or all of the transactions via at least one vend settlement server.

In yet another embodiment, a vending network can be provided. The vending network can include at least one server operable to receive inputs for cash transactions and/or cashless transactions from a plurality of transaction-type devices associated with respective vending machines. Furthermore, the vending network can include at least one vend settlement server operable to communicate with the at least one server, wherein the at least one vend settlement server can settle some or all of the transactions. In addition, the vending network can include an operator server operable to communicate with the at least one vend settlement server to facilitate management of at least one operational function comprising the following: vending machine fill-to-fill management, route management, and vend transaction management.

Other embodiments and aspects of the invention are described in detail herein and are considered a part of the claimed invention. For a better understanding of embodiments of the invention with features and aspects, refer to the description and to the drawings.

BRIEF DESCRIPTION OF THE FIGS.

The foregoing and other features, and aspects of the invention are apparent from the following detailed description taken in conjunction with the accompanying drawings in which.

DETAILED DESCRIPTION OF EMBODIMENTS OF THE INVENTION

As used herein, the term "transaction" can refer to a cash or cashless payment associated with a purchase of a good and/or service. Embodiments of the invention are intended to cover any combination of cash and/or cashless payments or transactions as well as payments or transactions relating to any combination of goods and/or services.

As used herein, the terms "server switch" and "server" can be used interchangeably. Embodiments of the invention are intended to cover any combination of servers, server switches, or other processing devices with similar functionality to a server or server switch.

As used herein, the terms "reconciliation token" and "unique identifier" can be used interchangeably. Embodiments of the invention are intended to cover any type of unique identifier including, but not limited to, a reconciliation token or any other device, code, or identifying instrument with similar functionality.

Figure 1:
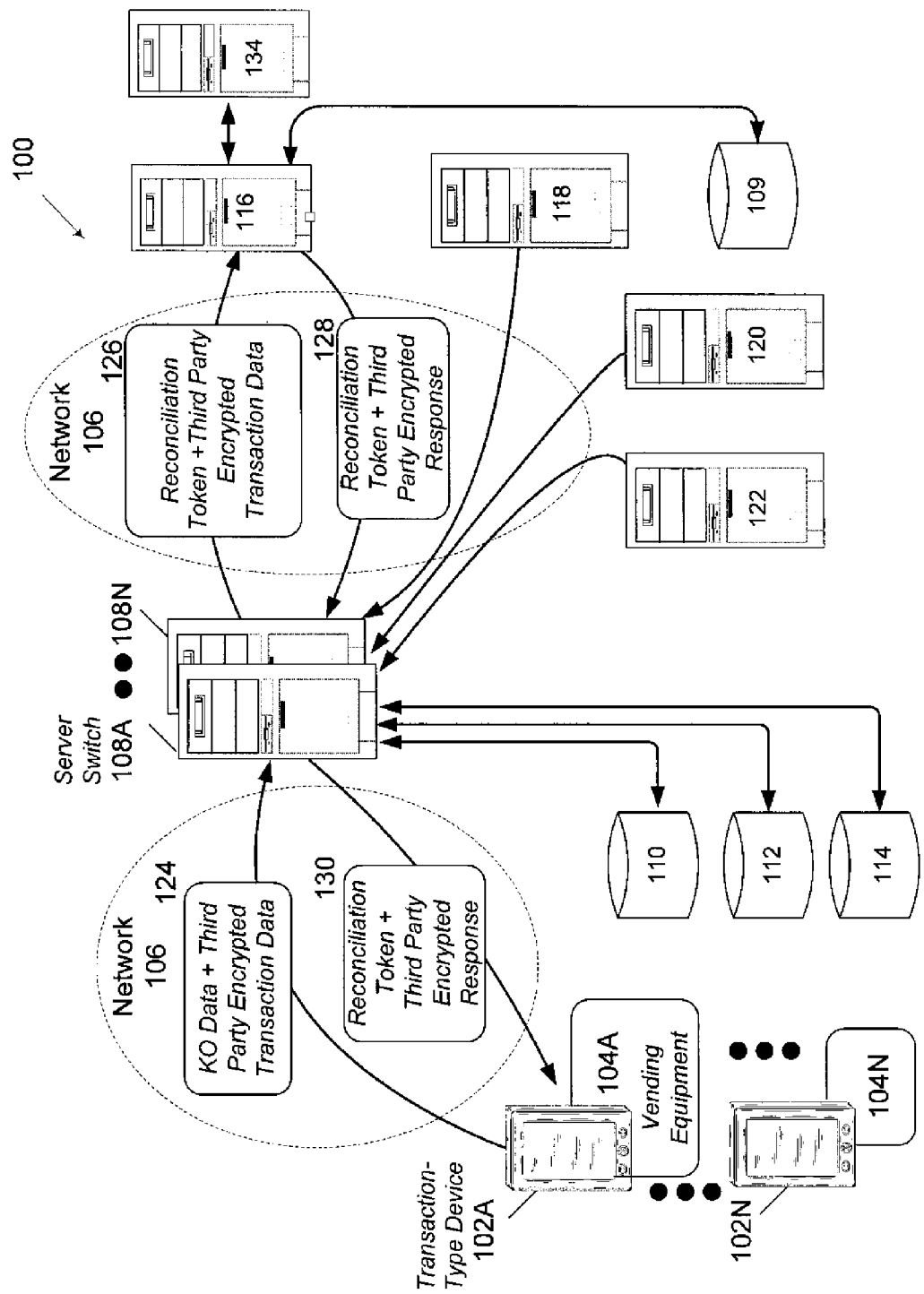
FIG. 1 illustrates an example system for providing a vending network in accordance with an embodiment of the invention.

Referring now to FIG. 1, an example of a system such as a vending network system 100 in accordance with an embodiment of the invention is shown. Embodiments of the invention can provide systems and methods for providing a vending network. Other embodiments of a vending network are shown in FIGS. 1-6. In general, embodiments of the invention can use one or more reconciliation tokens to track or otherwise mark any number of transactions handled by the vending network system 100 during communications between at least one server switch and one or more third party servers and/or a settlement engines.

In the embodiment shown in FIG. 1, a vending network system 100 can include one or more transaction devices 102A-N associated with respective vending equipment 104A-N. Some or all of the transaction-type devices 102A-N can be in communication via at least one network, such as 106, with one or more server switches, such as 10A-N. In one embodiment, one or more transaction-type devices 102A-N can be in communication with each other via one or more networks, such as 106.

Transaction-type devices 102A-N can be any processor-type device, and may be referred to individually as a data processing device. Some or all transaction-type devices 102A-N can be operable to receive and transmit data associated with at least one cash and/or cashless transaction, or a consumer. Such data may be referred to as transaction data. Transaction data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and any other type of data associated with a vending equipment transaction or a consumer. Examples of transaction-type devices can include, but are not limited to, a cash transaction reader, a cashless transaction reader, a combination cash and cashless transaction reader, a RFID reader, a biometric reader, an energy management system (EMS)-type device, a vending machine controller (VMC), and any other type of payment transaction devices. In some instances, a transaction device can be manufactured by HP™, DELL™, IBM/LENOVO™, and GATEWAY™, and may operate software provided by MICROSOFT™, and LINUX™.

In one embodiment, a transaction-type device, such as 102A, can be a payment device operable to accept a cash and/or cashless payment from a consumer, and further operable to facilitate the dispensing of goods and/or services from associated vending equipment, such as 104A. In another embodiment, a transaction-type device, such as 102A, can be a vending equipment controller operable to facilitate the operation of associated vending equipment, such as 104A.

Vending equipment 104A-N can include, but is not limited to, a product or beverage dispenser, a vending machine, a snack dispenser, a device capable of dispensing or providing a consumable food or drink item, a device capable of dispensing or providing a non-consumable item, or a device capable of facilitating purchase of a good and/or service. Vending equipment, such as 104A, can also be referred to individually as a vending machine. In some embodiments, vending equipment 104A-N may conform to vending industry standards including, but not limited to, the National Automatic Merchandising Association (NAMA) MDB specification, and the European Vending Association (EVA) DEX specification. In one embodiment, vending equipment 104A-N can include a vending industry standard-type multi-drop-bus (MDB) interface, and/or a data exchange (DEX) interface.

In one embodiment, multi-drop-bus (MDB) data can be collected from vending equipment, such as 104A-N, and the collected MDB data used to form transaction data records. In this regard, MDB data can include, but is not limited to, inventory, product pricing, and other data during vend events that can be combined with payment ID (for example a PIN number or credit card number) to form a transaction record. In addition, MDB data can be collected during non-vend events and used to form transaction records such as service requests, energy management records, and other types of transaction records.

In the embodiment shown in FIG. 1, a network 106 can be wired or wireless-type network, and may be more than one network to facilitate both wired and wireless-type communications between system components. The network 106 shown in FIG. 1 is shown by way of example. Examples of a network 106 can include, but are not limited to, a local area network (LAN), a wide area network (WAN), the Internet, a global network, a wireless network, a wired network, and any combination thereof. Wireless network communications can be implemented, for example, by way of GSM, GPRS, CDMA2000, 1XRTT, EDGE, 802.11 types and kinds including but not limited to 'a', 'b', 'g', 'n', 900 MHz, 2.4 GHz, 5 GHz, spread spectrum, open wireless standards, proprietary wireless techniques, 3G, 3.5G, 4G technologies ('G' stands for generation), and any other wireless-type communication device, standard, or methodology. Wired network communications can be implemented, for example, by way of Ethernet, Firewire, serial communications, USB, RS232, and any other wired-type communication device, standard, or methodology. In one embodiment, a network can be the Internet, which may be referred to as a global network.

In the embodiment shown, a server switch 108A can be a processor-based platform, such as a server. In one embodiment a server switch 108A can be operable to store a copy of some or all of transaction data received from one or more transaction devices 102A-N. The server switch 108A may store some or all of the transaction data in an associated database or data storage device, such as 110, 112, or 114. In another embodiment, a server switch, such as 108A, can be operable to generate a unique identifier, such as a reconciliation token, and associate the unique identifier or token with or otherwise add the unique identifier or token to a transaction record. In some embodiments, a server switch, such as 108A, can generate and associate a unique identifier or reconciliation token with some or all transactions which may be transmitted via a network, such as 106, by the system 100.

As shown in FIG. 1, the system 100 can also facilitate communications with one or more servers 116, 118, 122 and/or third parties 120. In the embodiment shown, some or all of the transaction-type devices 102A-N can be in communication with at least one of the following: a vend settlement server 116, a data services server 118, a financial institution 120, a third party server 122, and/or any device associated with a third party. In this embodiment, a transaction-type device, such as 102A, can transmit data via a network, such as 106, to a server switch, such as 108A. The server switch 108A can selectively transmit some or all of the received data to another transaction-type device, such as 102N; another server switch, such as 108N; a vend settlement server, such as 116; a data services server, such as 118; a financial institution, such as 120; a third party server, such as 122; or any other device associated with a third party. Data received by a vend settlement server 116, a data services server 118, a financial institution 120 and/or a third party server 122 can be stored in an associated database, such as 109, or other data storage device.

In one embodiment, a transaction-type device, such as 102A, can transmit data to a vend settlement server, such as 116, via a network, such as 106, and server switch, such as 108A. Data initially received or otherwise collected by the transaction-type device 102A can be transmitted to the server switch 108A in a format such as a data packet 124. The data can include, but is not limited to, vending equipment load-to-load (also referred to as fill-to-fill) information, vend transaction matching and reconciliation processing data, electronic find transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and/or any other type of data associated with a vending equipment transaction or a consumer. Ultimately, some or all of the data can be transmitted by the server switch, such as 108A, to a vend settlement server, such as 116.

In one embodiment, one or more reconciliation tokens can facilitate auditing some or all of the transaction data handled by one or more vend settlement servers 116 and/or third party servers 122. For example, a server switch, such as 108A, can communicate at least one reconciliation token with each transaction to a vend settlement server 116 and/or third party server 122, and receive transaction data from the vend settlement server 116 and/or third party server 122 in response to each reconciliation token. In this example, a server switch 108A can transmit at least one reconciliation token in a data packet 126 to a vend settlement server 116 and/or third party server 122. In response to the receiving one or more reconciliation tokens, the vend settlement server 116 and/or third party server 122 can transmit a data packet 128 with response data including the one or more reconciliation tokens to the server switch 108A. Such response data can be compared to previously transmitted transaction data or other data previously stored in a database, such as 110, 112, or 114, or other data storage device associated with the server switch 108A. In one embodiment, a vend settlement server such as 116 can be referred to as a third party server and can be audited in a similar manner described above.

Furthermore, in one embodiment, a server switch, such as 108A, can be operable to switch or otherwise transfer one or more transaction records between various destination servers. For example, transaction data stored on a particular server can be transferred to another server by way of a server switch, such as 108A. Moreover, a server switch 108A can be operable to issue a data packet 130 with one or more reconciliation tokens in response to transaction data received or transmitted by the server switch 108A. In addition, a server switch 108A can be operable to maintain at least one transaction database for storing transaction data, such as a plurality of databases including a KO database 110, reconciliation database 112, and device database 114.

In one embodiment, a server switch, such as 108A, can be operable to control access to a network, such as 106, by inspecting each transaction received at the server switch 108A. For example, before passing transaction data from a transaction-type device, such as 102A, to a destination location, the server switch 108A can check a database, such as the device database 114, to ensure that the transaction-type device, for instance 102A, from which the transaction is received is allowed to use the network 106. If the transaction-type device 102A is not allowed to use the network 106, the transaction data is not forwarded to the destination location and optionally the transaction-type device 102A can be informed by the server switch 108A that access to the network 106 is denied.

In another embodiment, a server switch, such as 108A, can be operable to control the types or classes of transactions a particular transaction-type device, such as 102A, is allowed to transmit on a network, such as 106. In this regard, the server switch 108A can inspect the type or class of transaction being transmitted, compare each transaction type or class to one or more allowed types or classes of transactions stored in a database, such as device database 114, and determine if such a transaction is allowed from the particular transaction-type device 102A. For example, if a transaction-type device 102A is deployed to accept a particular class of transactions, such as hotel room key cards, the server switch 108A can prevent or otherwise limit all other transactions, such as non-hotel room key cards, from being used.

Figure 2:
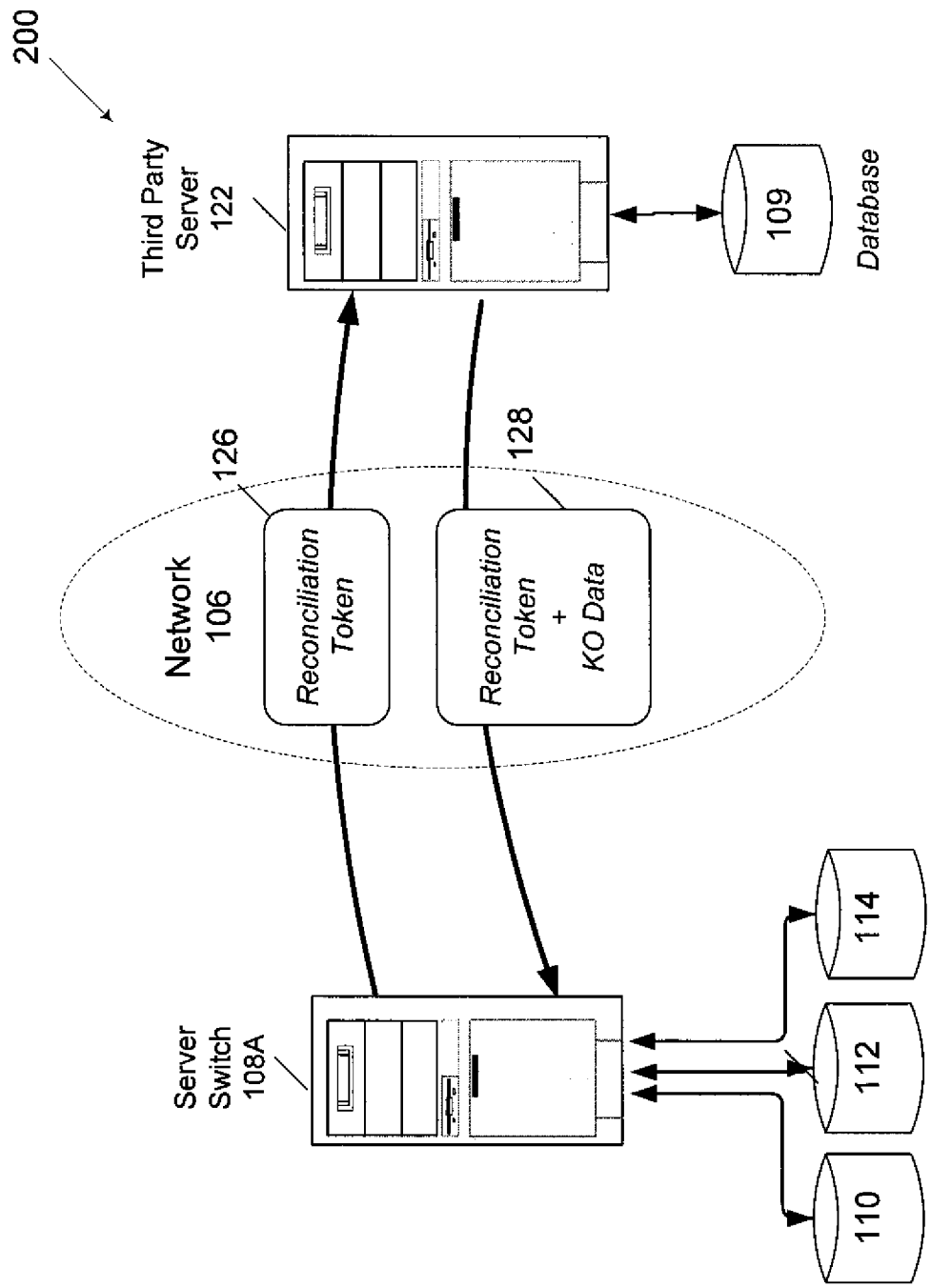
FIG. 2 illustrates an example of a system that uses a reconciliation token during communications between a server switch and a third party server and/or a settlement engine in accordance with an embodiment of the invention.

Referring to FIG. 2, an example system 200 for tracking one or more transactions in a vending network in accordance with an embodiment of the invention is shown. The system 200 can be implemented using some or all of the system components shown in FIG. 1, and in this example, some of the system components of system 100 are utilized. In this embodiment, the system 200 can include a data flow which commence when a transaction-type device, such as 102A, can initiate communication with a third party server, such as 118, by way of server switch, such as 108A. For example, the transaction-type device 102A can generate and transmit at least one data packet, such as 124, which can include transaction data that can be encrypted such that a third party server, such as 118, can decrypt the data by way of at least one decryption key. In some instances, the encrypted transaction data can include other data, such as KO data, and can be further encrypted wherein the server switch 108A can decrypt the data by way of another decryption key. In any instance, the server switch 108A can receive the encrypted data, or data packet 124, and after processing the encrypted data or data packet 124, the sever switch 108A can transmit a corresponding data packet, such as 126, to the third party server 122. After receipt and processing of the data packet 126, the third party server 118 can transmit a corresponding data packet, such as 128, to the server switch 108A, wherein the server switch 108A decrypts and processes the data. Processing of the data by a server switch, such as 108A, can include some or all of the following activities: verifying that a transaction-type device, such as 102A, is authorized to access a network, such as 106; verifying that a transaction-type device, such as 102A, is authorized to perform a particular transaction type or class; generating at least one reconciliation token; and storing data, such as KO data, in a database or data storage device, such as 110, 112, and/or 114.

Referring back to the server switch, the server switch, such as 108A, can generate at least one data packet by either generating at least one new reconciliation token if a particular transaction requires it (such as when an initial authorization request is made) or identifying and/or retrieving a previously assigned reconciliation token (such as when a third party server 122 is communicating a response to transaction-type device, such as 102A). The data packet, for example 126, can include at least one reconciliation token and previously received third party or transaction data. In some instances, the previously received third party or transaction data can be encrypted if desired. The data packet 128 can be communicated to the third party server 122.

Referring to the third party server, upon receipt of the data packet 126, the third party server, such as 122, can process the received data packet 126. Such processing can include, but is not limited to, decrypting the encrypted packet and acting on the data, or storing a reconciliation token and/or other associated transaction data in a database or data storage device, such as 110, 112, or 114.

During or after completion of processing the data packet 126 at the third party server 122, the third party server 122 can wait for a response to be communicated to transaction-type device 102A. In this regard, a data packet, such as 128, can be generated by the third party server 122 to include at least one previously received reconciliation token that was associated with the particular transaction at the server switch 108A, as well as response data from the third party server 122. In some instances, the response data from the third party server 122 can be encrypted if desired).

The third party server 122 can communicate the data packet 128 to the server switch 108A. The server switch 108A receiving the data packet 128 can use at least one reconciliation token to verify that a predefined transaction state sequence is being followed, and can update one or more state fields associated with the instant transaction. The server switch 108A can update one or more databases as necessary, and/or otherwise process the received data packet 128. The server switch 108S can communicate a corresponding data packet 130 to the transaction-type device 102A. The data packet 130 can be received at the transaction-type device, such as 102A, where the transaction-type device 102A can process the data packet 130 and associated response data. In this example, data packets 124, 126, 128, and 130 can be of the same or similar format.

In one embodiment, a state machine data structure can be established by a server switch, such as 108A, for a particular class of transaction. In this regard, the server switch 108A can determine if a particular transaction-type device, such as 102A, is allowed to perform a particular class of transaction (for example, a hotel room key card-type-transaction) and prevent or otherwise limit the transaction-type device 102A from performing certain types of transactions (for example, RFID credit card-type transactions). Using state machine logic or a set of instructions, the server switch 108A can ensure that a prescribed sequence of communications between the transaction-type device 102A and the third party server 122 is maintained.

For example, when a transaction-type device, such as 102A, facilitates a sales or vending transaction at a vending machine, such as 104A, by way of a user paying with a credit card, a state of the transaction can be as follows. Initially, a first state can be recorded by a server switch, such as 108A, as an initial authorization request by the transaction-type device 102A. Another state can be a response to the initial authorization request by a third party server, such as 122. Yet another state can be a completed sales record communicated from the transaction-type device 102A when the user completes the sales or vending transaction. Another state can be when the third party server 122 acknowledges the receipt of the completed sales transaction record communicated from the transaction-type device 102A.

In this embodiment, the state tracking capability of a server switch, such as 108A, related to each class of transactions and for each individual transaction can permit the server switch 108A to provide accountability for some or all transactions. This can include, but is not limited to, tracking which transactions are in a particular state of processing, and instructing a transaction-type device, such as 102A, and an associated third party server, such as 122, to adhere to a predetermined sequence of communications (also referred to as "state machine type logic"). In the case where a transaction sequence is unsuitable or otherwise incorrect, a server switch, such as 108A, can stop or delay a particular transaction from proceeding and/or send a message to either or both the transaction-type device 102A and the third party server 122. This feature can permit the server switch 108A to maintain accountability of each transaction-type device 102A-N, each third party server, such as 122, and to also maintain oversight of the manner in which transaction-type devices, such as 102A-N, and an associated third party server, such as 122, communicate to perform certain classes of transactions.

One aspect of using one or more state conditions to monitor, control and/or track transactions is that at any time a server switch, such as 108A, can determine which transactions have been completed. In this regard, such information can be used, for example, to more accurately identify transactions that may appear to have been lost. Such transactions may have been authorized, but never settled, as such, the state of these missing transactions is that the transactions may only have been partially completed (no sales information, no settlement, no EFT, etc.). This aspect permits a user, via the server switch, such as 108A, to identify possible issues related to payment for products and/or services. In addition, the user can identify issues related to any number of transaction-type devices 102A-N, servers such as a third party server 122, and/or other issues related to transaction processing by the system 100.

Figure 3:
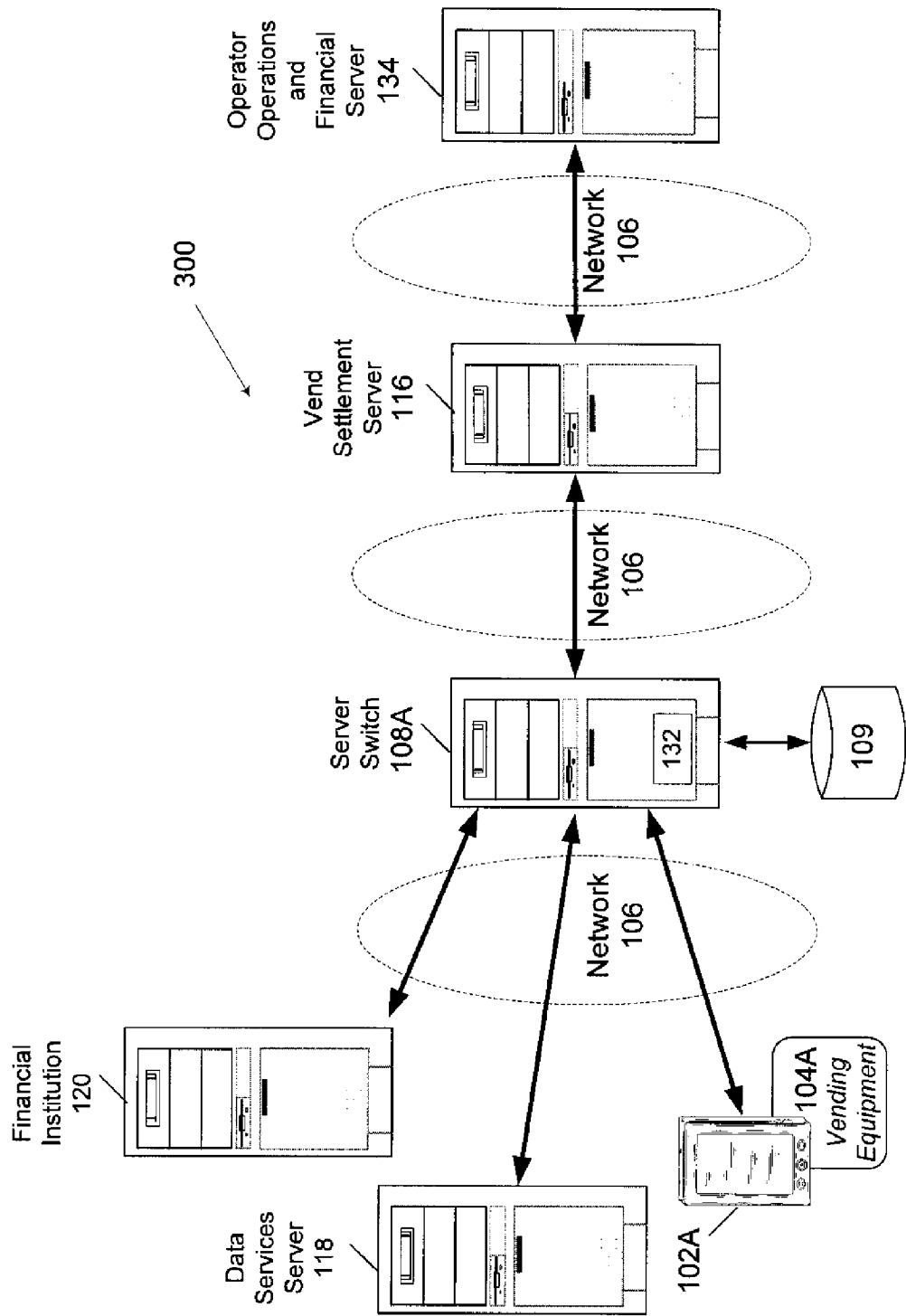
FIG. 3 illustrates an example of a system that utilizes a settlement engine to provide operational and financial data processing for an operator server in accordance with an embodiment of the invention.

Referring to FIG. 3, an example system 300 for providing a vending network in accordance with an embodiment of the invention is shown. The system 300 can be implemented using some or all of the system components shown in FIG. 1, and in this example, some of the system components of system 100 are utilized.

In the embodiment shown in FIG. 3, a vend settlement server, such as 116, can provide some or all operational and financial data processing for an associated operator server, such as 134. An operational server can be operable to manage vending equipment, such as 104A-N, and/or one or more associated vending routes. The vend settlement server 116 can be operable to coordinate the reconciliation of coins, bills, cashless transactions, and other types of inventory management data. As shown, the vend settlement server 116 can communicate with the operator server 134. With data provided by the vend settlement server 116, the operator server 134 can provide route management for vending equipment, such as 104A-N, including, but not limited to, reporting, route management, accountability, service, financial management, business analysis, asset management, product inventory management, and data processing. In this regard, a vend settlement server such as 116 can be operable for money reconciliation, pre-cashless settlement processing (determining the revenue cashless transactions should produce), post settlement processing (determining the revenue actually received from cashless transaction processing—as an example from EFTs), and coordinate the delivery of finds, inventory, and other vending equipment data to an associated operator server such as 134.

In operation, the operator server 134 can communicate with the vend settlement server 116. Initially, transaction data from one or more transaction-type devices, such as 102A, and associated vending equipment, such as 104A, can be received or otherwise collected by the server switch 108A. The server switch 108A can communicate further as needed or desired with a data services server, such as 118 and/or a third party such as a financial institution 120. As discussed previously, transaction data can be communicated by the server switch 108A to the vend settlement server 116 for processing and/or storage. Optionally, a vend settlement server, such as 116, can utilize one or more databases to store data as may be required or desired, such as a transaction database 109. In any instance, the vend settlement server 116 can communicate with the operator server 134 to handle some or all of the following activities reconciliation of coins, bills, cashless transactions, and other types of inventory management data; reporting; route management; transaction accountability; service; financial management; business analysis; asset management; product inventory management; data processing; money reconciliation; pre-cashless settlement processing (determining the revenue cashless transactions should produce); post settlement processing (determining the revenue actually received from cashless transaction processing—as an example from EFTs); and coordinate the delivery of funds, inventory, and other vending equipment data.

In this manner, reconciliation of bills, coins, and cashless transactions can be synchronized with the product or inventory that a route operators fills the vending equipment with, or otherwise restocks the vending equipment with. Delays in processing certain types of cashless transactions, such as credit card transactions, can result in less than 100% accountability of payment detail (bills, coins, and cashless revenues) at the time the route operator is restocking the vending equipment. As such, the ability to determine what has been sold and paid for can be difficult to determine at any given time and especially when cashless transactions are delayed by processing, such as pending electronic funds transfers (EFTs). In addition, the inability to accurately determine what has been purchased from the vending equipment can cause the route personnel to incorrectly select the restock product to load on to the route truck before traveling to the vending equipment location, which may cause too much or too little restock product to be carried on the route for subsequent restocking.

Figure 4:
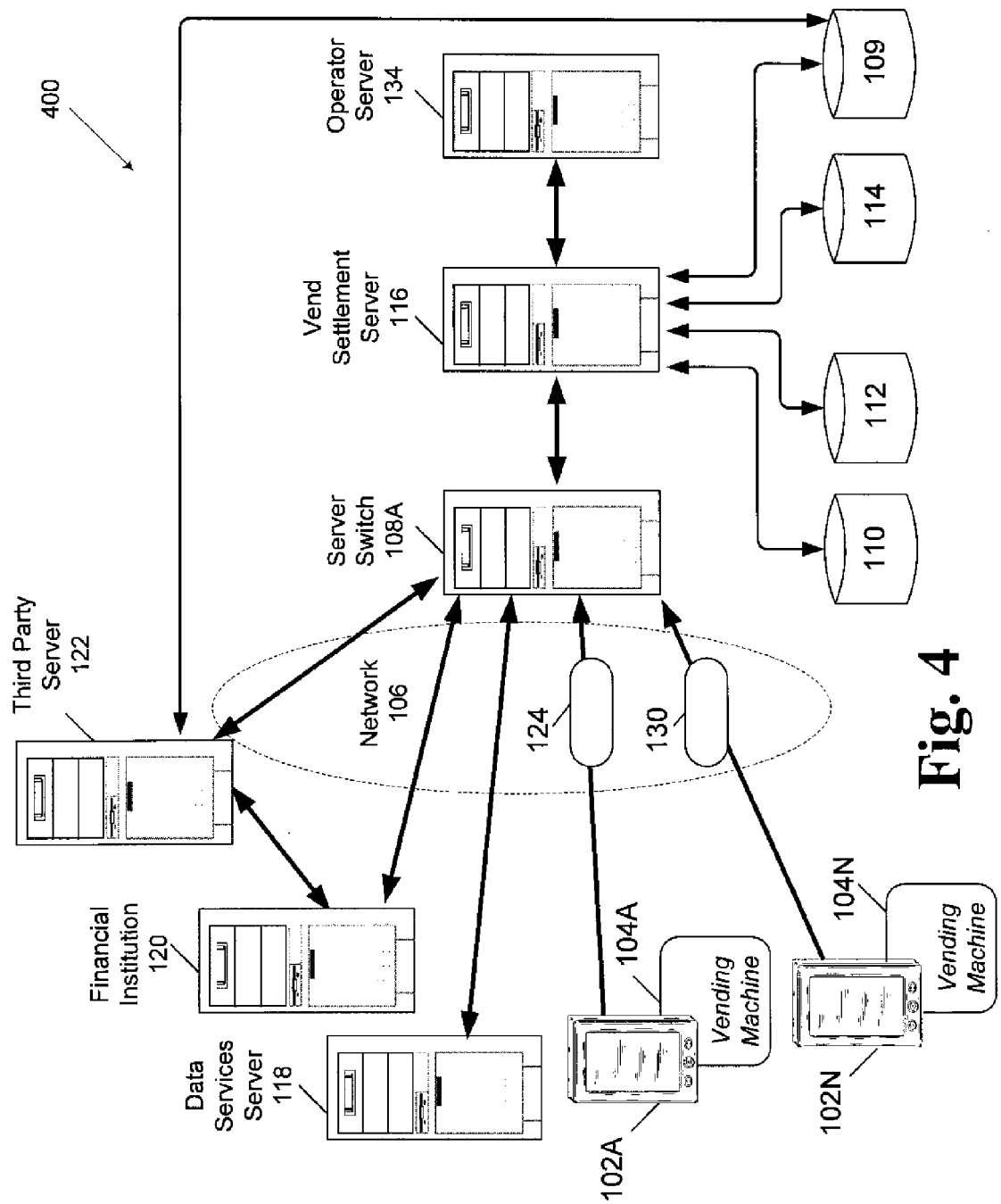
FIG. 4 illustrates an example of a system that utilizes a server switch to interface to devices, vend settlement servers, third party servers, financial institutions, and other data services in accordance with an embodiment of the invention.

In FIG. 4, an example system 400 for providing a vending network in accordance with an embodiment of the invention is shown. The system 400 can be implemented using some or all of the system components shown in FIG. 1, and in this example, some of the system components of system 100 are utilized. In the system shown, a server switch 108A can be in communication with a plurality of third party servers 122, such third party servers 122 utilizing a plurality of databases, such as transaction database 109. At least one of the third party servers 122 can be in communication with one or more financial institution servers 120, and by way of server switch 108A in communication with a plurality of transaction-type devices 102A-N. In this configuration, at least one third party server 122 can process transactions from the plurality of transaction-type devices 102A-N, and via server switch 108A can provide transaction level detail data and EFT level detail data to at least one vend settlement server 116, where such data is processed or otherwise reconciled with other data (non-cashless and other data) and then data communicated to the operator server 134.

In addition, optionally the server switch 108A can communicate with at least one financial institution server 120A and/or at least one data services server 118. In this regard, the server switch 108A can process transactions, providing as may be required and/or desired transaction level detail data, EFT level detail data, and/or other types of data or detail data to at least one vend settlement server 116, wherein the vend settlement server 116 with other data including data from at least one third party server 122 can process data and communicate as necessary with at least one operator server 134 to facilitate route management for vending equipment, such as 104A-N, including reporting, route management, accountability, service, financial management, business analysis, asset management, product inventory management, and data processing.

In the embodiment shown, a server switch, such as 108A can be in communication with one or more transaction-type devices, such as 102A-N, at least one vend settlement server 116, one or more third party servers 122, one or more financial institutions 120, and one or more data services servers 118. The transaction-type devices 102A-N can communicate different types of data, such data formatted in one or more data packets, to the server switch 108A. For example, a data packet 124 can include KO data and third party transaction data (encrypted if necessary). A second transaction-type device, such as 102B, may communicate formatted KO data illustrated as data packet 136. The flexibility of the server switch 108A to accommodate a plurality of different types of data, associated data packets, and data formats permits relevant data to be inspected and processed at the server switch 108A, such as KO data, as well as allow, if necessary, third party data (encrypted and/or otherwise proprietary) to be transmitted by the server switch 108A to a destination third party server, such as 122, and/or to a vend settlement server, such as 116.

An aspect of this embodiment is that collection of data from a plurality of transaction-type devices, such as 102A-N, at the server switch, such as 108A, can be relatively homogeneous across the plurality of devices, such as 102A-N. This can be implemented by some embodiments regardless of the type or purpose of the plurality of transaction-type devices. Another aspect of this embodiment is that oversight and accountability at the server switch, such as 108A and vend settlement server, such as 116, can be relatively easily maintained due in part to relatively homogenous data being received at the server switch 108A.

In another embodiment, an aspect is the ability for third party servers such as third party server 122 to receive data from the same transaction-type devices, such as 102A-N, in a format that allows the third party server 122 to continue operating as designed. In other words, transaction-type device, such as 102A, is operable to send a data packet (for instance, KO data and/or third party data) that can be both understood by the server switch, such as 108A, and by the third party server, such as 122. This permits both servers, the server switch 108A and the third party server 122, to function with minimal or no changes. This "shared data type function" can permit one or more third parties with their own information technology (IT) infrastructure, perhaps tailored to provide a particular product and/or service to their own customers, to use a vending network in accordance with an embodiment of the invention to both satisfy their third party data needs as well as satisfy needs of the server switch, such as 108A, a vend settlement server, such as 116, and/or an operator server, such as 134.

Another aspect of this embodiment can permit one or more third parties to provide various services to customers (web based and/or otherwise) from their own IT infrastructure while allowing a vending network in accordance with an embodiment of the invention, managed by the server switch, such as 108A, to maintain accountability, audit ability of the network, and utilize a vend settlement server, such as 116, to meet some or all of the needs of one or more vending route operators by way of an operator server, such as 134, and vending equipment personnel that may rely on the operator server 134 to operate or otherwise manage their respective businesses.

In one embodiment of a system for providing a vending network, as illustrated in FIG. 4, one or more databases, such as 109, 110, 112, and 114, or data storage devices can be associated with either or both a vend settlement server, such as 116, and/or the server switch, such as 108A.

In one embodiment of a system for providing a vending network, as illustrated in FIG. 4, a vend settlement server, such as 116, can initiate an audit of a third party server, such as 122. In this regard, a vend settlement server, such as 116, can generate and transmit one or more reconciliation tokens to a third party server, such as 122, by way of transmitting a data packet to the third party server 122, and the vend settlement server 116 can receive a data packet including a response from the third party server 122.

Another embodiment of a system for providing a vending network can include a combination of servers, wherein a server originating an audit of a third party server, such as 122, can either be a server switch, such as 108A, or a vend settlement server, such as 116, and a data packet including a response from a third party server, such as 122, can be sent to a non-originating server, such as either the server switch 108A or a vend settlement server 116.

Figure 5:
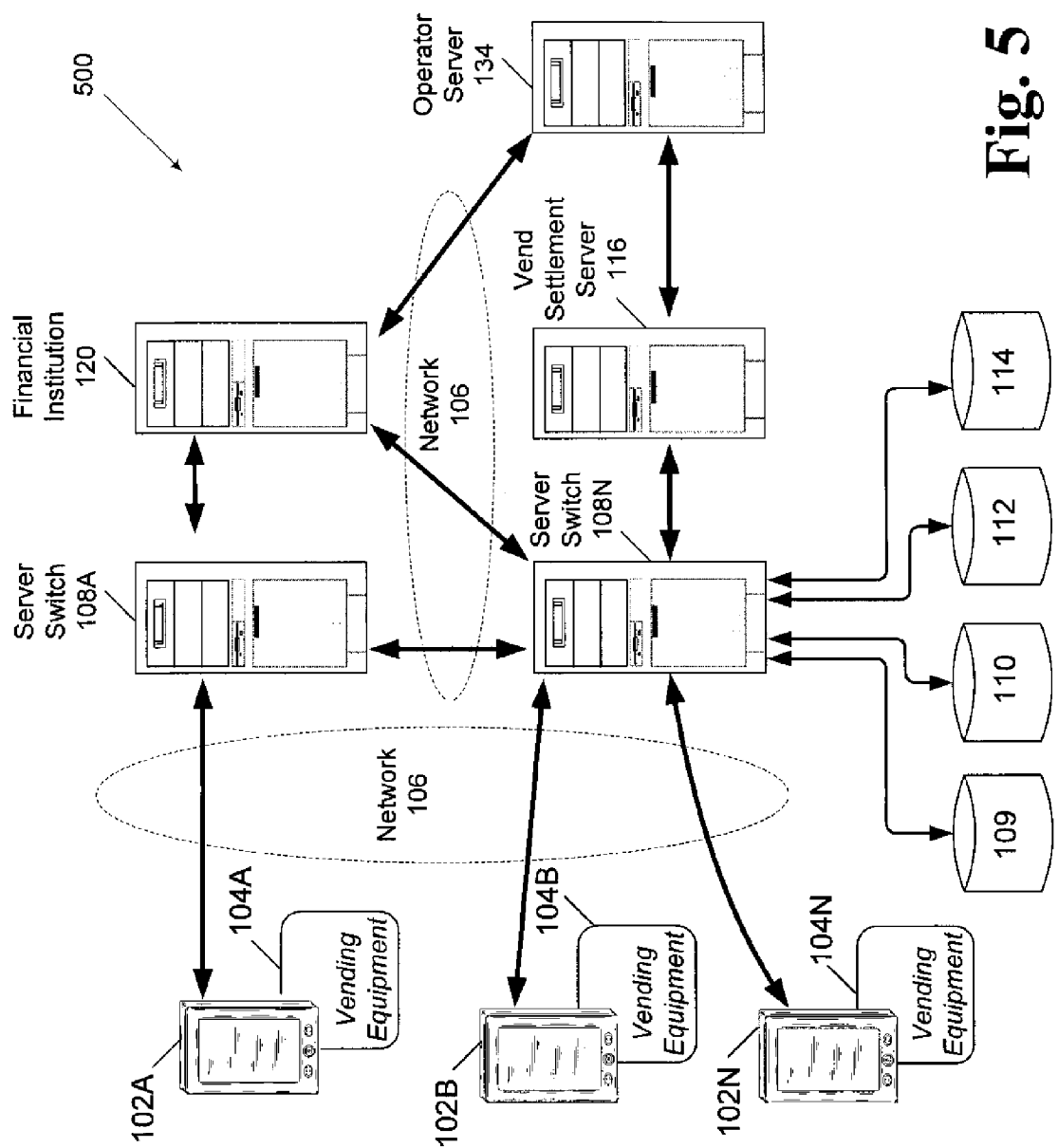
FIG. 5 illustrates an example of a system that uses a plurality of server switches, and provides for flexible financial transaction handling and device network connectivity via the plurality of server switches and/or the settlement engine in accordance with an embodiment of the invention.

Referring to FIG. 5, an example system 500 for providing a vending network in accordance with an embodiment of the invention is shown. The system 500 can be implemented using some or all of the system components shown in FIG. 1, and in this example, some of the system components of system 100 are utilized. In this embodiment, the system 500 can include a plurality of server switches, such as 108A-N in communication with a plurality of transaction-type devices, such as 102A-N, and at least one vend settlement server, such as 116. The plurality of transaction-type devices 102A-N can utilize one or more of the plurality of server switches 108A-N to communicate with various data processing equipment, such as financial institution 120, the vend settlement server 116, and/or other third party servers, such as 122. The system embodiment shown can provide relatively flexible financial transaction handling and device network connectivity. In this manner, different transaction-type devices and server switches can be utilized to aggregate bills, coins, cashless, inventory, and/or other types and kinds of transaction data.

The flexibility and connectivity of the system embodiment shown can permit in some instances, certain cashless transactions to be processed where a sale amount is known but the actual funds are not yet available. For example, on occasion certain cashless transaction types, such as credit cards, may appear as a "good account" when authorized, but when it comes time to settle the transaction with the actual sale amount, the settlement process may sometimes fail. Such failures can occur for various reasons including the expiration of a credit card, an account being closed sometime after authorization but before settlement, and for many other reasons. In addition, there can be typically about a 24-72 hour delay from the time the settlement process occurs and the time the funds are actually available.

These circumstances, in combination with the fact that operators of vending equipment may need to synchronize coins, bills, and cashless transactions in a timely manner (often quicker then cashless funds are available) to facilitate route and inventory management, can provide a need to track cashless transactions in a pre-settled state, a post-settled state, and/or by EFT summary detail.

Pre-settled cashless transaction can be characterized as transactions that have been completed at vending equipment, such as 104A-N, and include a sale amount and any associated vend detail but still have to be communicated to a financial institution for settlement. Post-settled cashless transactions can be characterized as cashless transactions that have been communicated to a financial institution for settlement but funds may not be available. EFT summary detail can be characterized as the actual funds available that have been deposited (wired into a bank account).

In operation, there may be times when pre-settled cashless transaction details (sales that have not been settled) need to be combined with coins, and to reconcile vending equipment as well as to manage inventory. During other situations, post-settled cashless transaction detail may need to be relied upon, and finally EFTs may be reconciled to better manage the operator business. In one embodiment, the various states and conditions related to cashless transaction handling can be accommodated by the example system shown in FIG. 5.

As shown in FIG. 5, a financial institution, such as 120, can be in communication with at least one server switch, such as 108A-N, and at least one vend settlement server, such as 116. In this manner, the system 500 can handle various cashless transactions as well as provide a plurality of communication paths such that the server switches 108A-N and the vend settlement server 116 can synchronize some or all of the cashless transactions in a variety of states. The system 500 can also handle EFTs, coins, and bills, thus facilitating route management of vending equipment, products and service inventory, and/or financial accountability at an operator server, such as 134.

Figure 6:
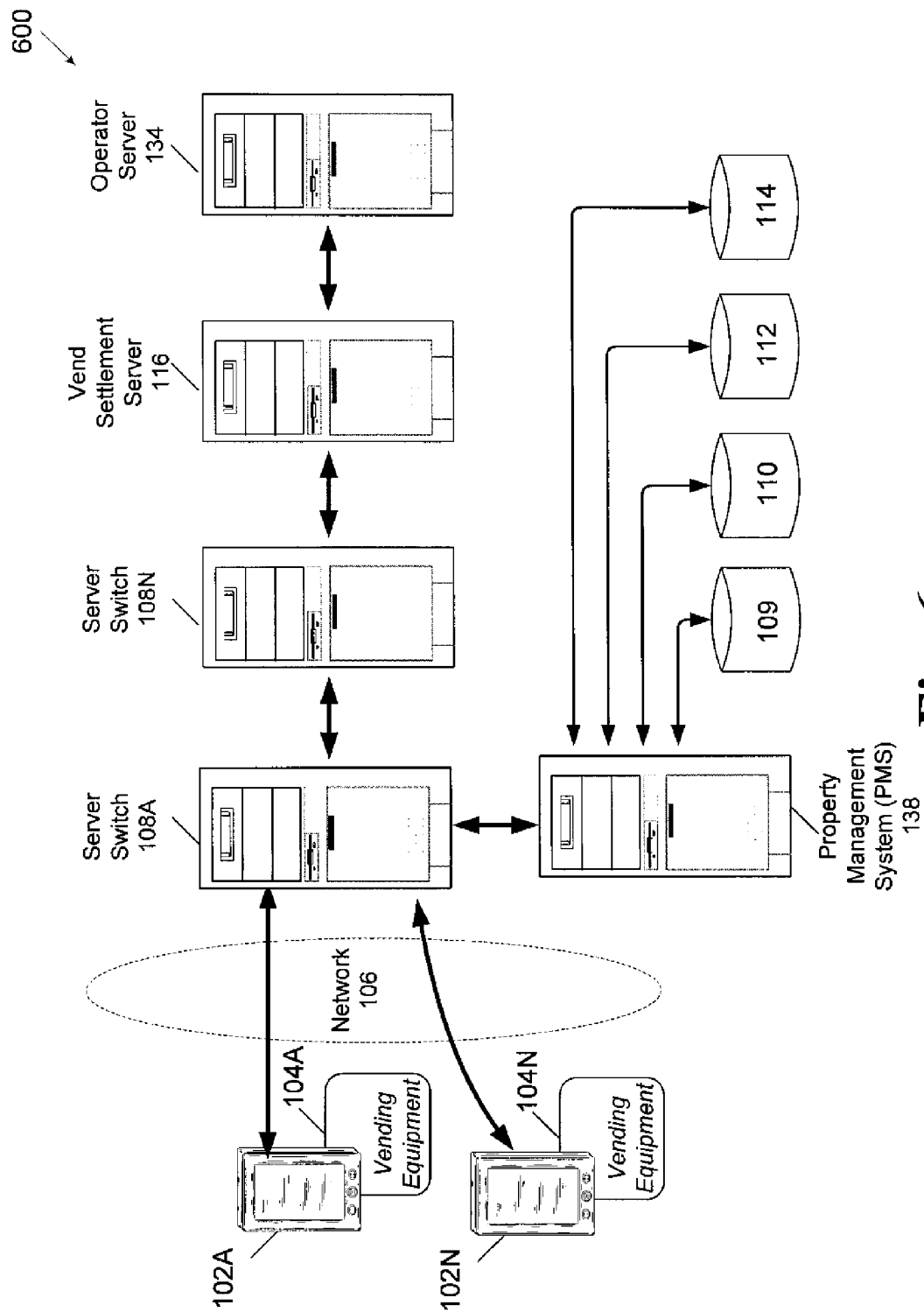
FIG. 6 illustrates an example of the server switch interfacing to a property management system (PMS) in accordance with an embodiment of the invention.

Referring to FIG. 6, an example system for providing a vending network in accordance with an embodiment of the invention is shown. The system 600 can be implemented using some or all of the system components shown in FIG. 1, and in this example, some of the system components of system 100 are utilized. In this embodiment, the system 600 can include at least one server switch in communication with at least one property management system (PMS). For example in the embodiment shown in FIG. 6, server switch 108A can be in communication with property management system 138. In one embodiment, a property management system can be used in a hotel or other places to manage guest portfolios including check-in guests, assign rooms, accrue guest charges, and for performing other services. In another embodiment, a property management system can be used in a location where third party information is desired to be managed in a relatively secure location associated with the third party.

In one embodiment, the system 600 can process transactions associated with hotel room keys. For example, one or more hotel room key cards can be utilized to allow hotel guests to use a respective hotel room key card at one or more transaction-type devices, such as 102A-N. In some instances, a hotel guest may desire to have a product or service purchase added to his or her portfolio or invoice managed by a property management system, such as 138. In this regard, by using his/her hotel room key card, a guest can have his/her purchases at transaction-type devices 102A-N billed to his/her room and pay for the vended products and/or services when the hotel bill is paid.

In one embodiment, one or more transaction-type devices, such as 102A-N, can generate and send transaction data, such as data packets 124 shown in FIG. 1, to a server switch, such as 108A. In certain instances, property management may not want certain transaction data, such as hotel key card data, to leave the premises for security reasons, and the use of a wide area network (WAN) configuration where a server switch is located at a remote location may not be acceptable to property management. One aspect of a server switch, such as 10A, can be the location of the server switch at or on property owned or otherwise controlled by property management. In this manner, a server switch, such as 10 8A, can communicate with a plurality of transaction-type devices, such as 102A-N, which may be hotel key card reading devices, and also communicate with the property management system, such as 138.

In one embodiment, certain transaction data such as hotel key card data can remain onsite, but other transaction data, such as credit card transactions, sales information, inventory, service, and other data may be acceptable to communicate remotely. In this example, a first server switch, such as 108A, can communicate with one or more other server switches, such as 108N, and as necessary, to one or more vend settlement servers, such as 116, third party servers, such as 122, operator servers, such as 134, and/or to other data processing equipment.

In one embodiment, a server switch, such as 108A, can be integrated into at least one transaction-type device, such as 102A-N. In this example, at least one of a plurality of transaction-type devices, such as 102A-N, can function as a server switch in addition to performing various features and functions as a transaction-type device, such as 102A-N. In this regard, a system in accordance with an embodiment of the invention may implement one or more micro-type server switches with respective transaction-type devices rather than having an independent server switch serving the transaction-type devices.

Figure 7:
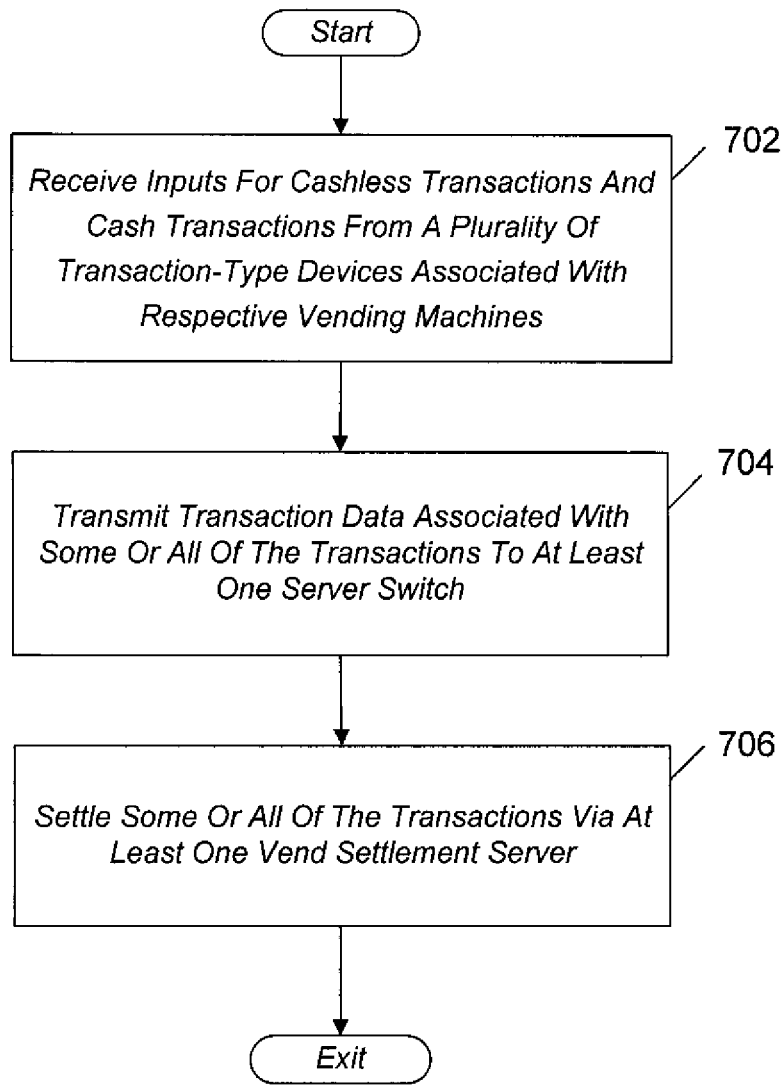
FIG. 7 illustrates an example method for providing a vending network in accordance with an embodiment of the invention.

FIG. 7 illustrates an example method for providing a vending network in accordance with an embodiment of the invention. In this embodiment, a method 700 for providing a vending network can be implemented by a system such as 100 in FIG. 1.

The method 700 can begin at block 702, in which inputs for cashless transactions and cash transactions are received from a plurality of transaction-type devices associated with respective vending machines. In the embodiment shown in FIG. 7, one or more transaction-type devices, such as 102A-N, associated with respective vending machines can receive inputs for cashless transactions and cash transactions.

Block 702 is followed by block 704, in which transaction data associated with some or all of the transactions is transmitted to at least one server switch. In the embodiment shown in FIG. 7, transaction data associated with some or all of the cashless transactions and cash transactions are transmitted by the transaction-type devices 102A-N to a server switch, such as 108A.

Block 704 is followed by block 706, in which some or all of the transactions can be settled via at least one vend settlement server. In the embodiment shown in FIG. 7, the server switch 108A can transmit some or all of the transactions to a vend settlement server, such as 116, where some or all of the transactions can be settled or otherwise reconciled. In one embodiment, a server switch such as 108A can associate a respective reconciliation token with some or all of the transactions.

The method 700 ends after block 706.

Figure 8:
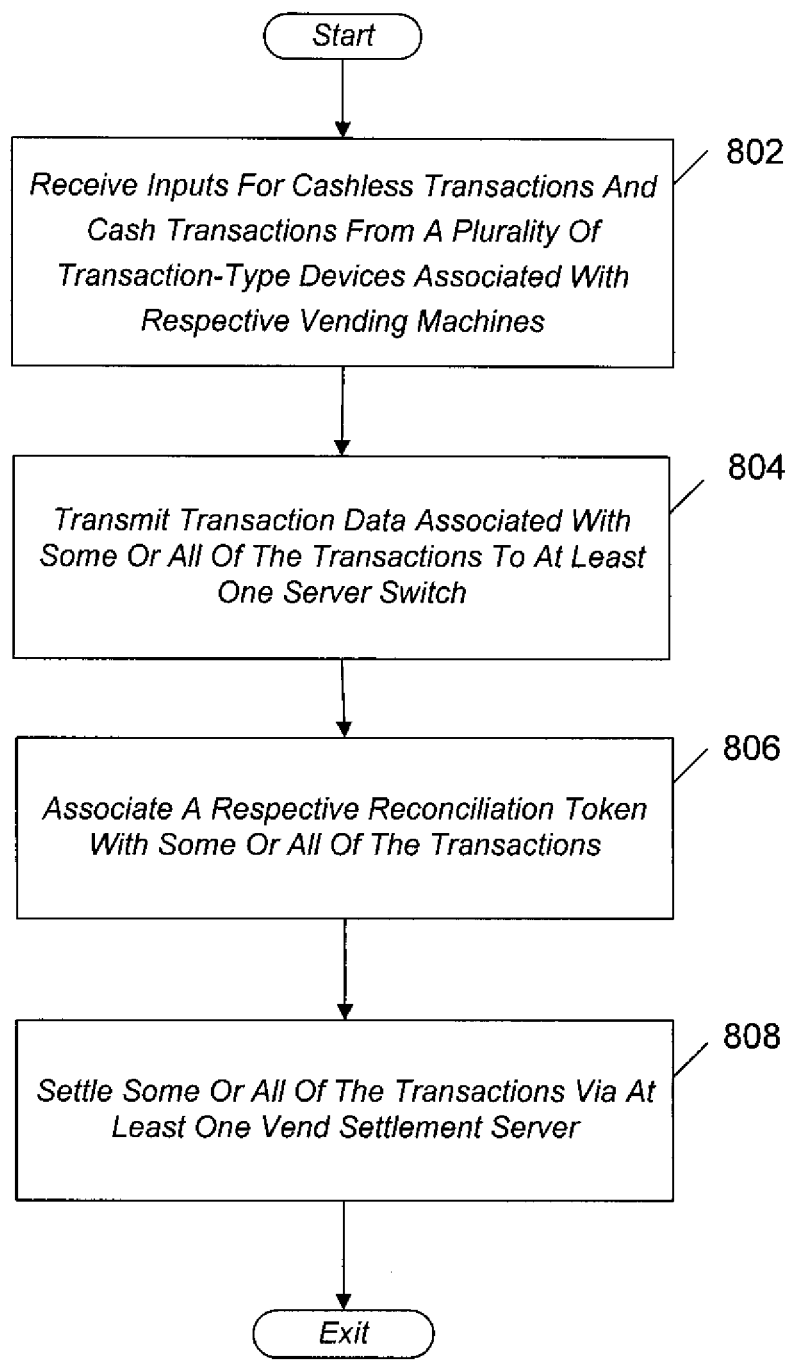
FIG. 8 illustrates another example method for providing a vending network in accordance with an embodiment of the invention.

FIG. 8 illustrates another example method for providing a vending network in accordance with an embodiment of the invention. In this embodiment, a method 800 for providing a vending network can be can be implemented by a system such as 100 in FIG. 1.

The method 800 can begin at block 802, in which inputs for cashless transactions and cash transactions are received from a plurality of transaction-type devices associated with respective vending machines. In the embodiment shown in FIG. 8, one or more transaction-type devices, such as 102A-N, associated with respective vending machines can receive inputs for cashless transactions and cash transactions.

Block 802 is followed by block 804, in which transaction data associated with some or all of the transactions is transmitted to at least one server switch. In the embodiment shown in FIG. 8, transaction data associated with some or all of the cashless transactions and cash transactions are transmitted by the transaction-type devices 102A-N to a server switch, such as 108A.

Block 804 is followed by block 806, in which a respective reconciliation token is associated with some or all of the transactions. In the embodiment shown in FIG. 8, the server switch 108A can associate a respective reconciliation token with some or all of the transactions.

Block 806 is followed by block 808, in which some or all of the transactions are settled via at least one vend settlement server. In the embodiment shown in FIG. 8, the server switch 108A can transmit some or all of the transactions to a vend settlement server, such as 116, where some or all of the transactions can be settled or otherwise reconciled.

The method 800 ends after block 808.

The capabilities of various embodiments of the invention can be implemented in software, firmware, hardware or some combination thereof.

As one example, one or more aspects of embodiments of the invention can be implemented in an article of manufacture (e.g., one or more computer program products) having, for instance, computer usable media. The media has embodied therein, for instance, computer readable program code as a means for providing and facilitating the capabilities of embodiments of the invention. The article of manufacture can be included as a part of a computer system or sold separately.

Additionally, at least one program storage device readable by a machine, tangibly embodying at least one program of instructions executable by the machine to perform the capabilities of an embodiment of the invention can be provided.

The flow diagrams depicted herein are just examples. There may be many variations to these diagrams or the elements (or operations) described therein without departing from the scope of the invention. For instance, the elements may be performed in a differing order, or elements may be added, deleted or modified. All of these variations are considered a part of the claimed invention.

While various embodiments of the invention have been described, it will be understood that those skilled in the art, both now and in the future, may make various improvements and enhancements which fall within the scope of the claims which follow. These claims should be construed to maintain suitable protection for embodiments of the invention described herein.

The claimed invention is:

1. A method for providing a vending network, comprising:
receiving inputs for monetary cashless transactions and non-monetary cashless transactions from a plurality of transaction-type devices associated with respective vending machines;
transmitting, to at least one remote server, first non-batch transaction data associated with at least a portion of the monetary cashless transactions and second non-batch transaction data associated with at least a portion of the non-monetary cashless transactions, wherein the at least one remote server is configured to inspect a class of transaction for each transaction in both at least the portion of monetary cashless transactions and at least the portion of non-monetary cashless transactions, and is further configured to permit further processing of an inspected cashless transactions when a class of transaction of the inspected cashless transaction has been previously approved to perform with the at least one transaction-type device; and
settling at least the portion of the cashless transactions via at least one vend settlement server.

2. The method of claim 1, wherein the at least one vend settlement server is configured to reconcile vending machine inventory, cash transactions, and monetary cashless transactions and non-monetary cashless transactions.

3. The method of claim 1, wherein the at least one vend settlement server is configured to reconcile pre-settled transactions and post-settled transactions.

4. The method of claim 1, wherein at least one vending machine comprises:
a multi-drop-bus (MDB) interface configured to communicate with the at least one transaction-type device; and
a DEX interface configured to communicate with the at least one transaction-type device.

5. The method of claim 1, wherein the plurality of transaction-type devices comprise at least one of a cash transaction reader, a cashless transaction reader, a combination cash and cashless transaction reader, a radiofrequency (RFID) reader, a biometric reader, an energy management system (EMS)-type device, a vending machine controller (VMC), or a payment transaction device.

6. The method of claim 1, further comprising storing at least a portion of the first non-batch transaction data or at least a portion of the second non-batch transaction data in at least one database or data storage device, wherein the first non-batch transaction data and the second non-batch transaction data comprise data indicative of one or more individual transactions.

7. The method of claim 1, wherein the monetary cashless transactions comprise credit card transactions, and wherein the non-monetary cashless transactions comprise hotel keycard transactions.

8. The method of claim 1, further comprising associating a respective reconciliation token with some or all of the monetary cashless transactions and non-monetary cashless transactions.

9. The method of claim 1, further comprising:
communicating at least one reconciliation token to the at least one vend settlement server; and communicating response data associated with a monetary cashless transaction or a non-monetary cashless transaction to the at least one server.

10. The method of claim 1, further comprising implementing state machine logic to track some or all of the monetary cashless transactions or a non-monetary cashless transactions.

11. The method of claim 1, further comprising permitting management of at least one operational function comprising vending machine fill-to-fill management, route management, and vend transaction management.

12. A system for providing a vending network, comprising:
at least one transaction-type device associated with a vending machine, wherein the at least one transaction-type device is configured to permit one or more of a monetary cashless transaction or a non-monetary cashless transaction, and wherein the monetary cashless transaction and the non-monetary transaction is associated with one or more products or services offered by the vending machine;
at least one server communicatively coupled with the at least one transaction-type device and configured to receive first non-batch data associated with the cashless transaction and second non-batch transaction data associated with the non-monetary cashless transaction,
the at least one server is further configured to inspect each class of transaction of both the monetary cashless transaction and the non-monetary cashless transaction, and permit further processing of the monetary cashless transaction when the respective class of transaction has been previously approved to perform with the at least one transaction-type device, and further permit further processing of the non-monetary cashless transaction when the respective class of transaction has been previously approved to perform with the at least one transaction-type device, and
the at least one server is further configured to associate a first unique identifier with each of the approved monetary cashless transactions, and further associated a second unique identifier with each of the approved non-monetary cashless transactions; and
at least one vend settlement server configured to communicate with the at least one server, wherein the at least one vend settlement server is configured to settle at least one of the approved monetary cashless transactions and at least one of the approved non-monetary cashless transactions.

13. The system of claim 12, wherein the at least one server is further configured to compare the respective class of transaction of the monetary cashless transaction and the respective class of transaction of the non-monetary cashless transaction with one or more allowed classes of transaction stored in a database in advance of the further processing.

14. A method for providing a vending network, comprising:
receiving inputs for monetary cashless transactions and non-monetary cashless transactions from a plurality of transaction-type devices associated with respective vending machines;
transmitting, to at least one server, first non-batch transaction data associated with at least a portion of the monetary cashless transactions and second non-batch transaction data associated with at least a portion of the non-monetary cashless transactions to at least one server, wherein the at least one server is configured to inspect class of transaction of each transaction of both at least the portion of the monetary cashless transactions and at least the portion of non-monetary cashless transactions, and further wherein the at least one server is further configured to permit further processing of at least one first transaction of the monetary cashless transactions when a respective first class of transaction has been previously approved to perform with the at least one transaction-type device, and is further configured to permit further processing of at least one second transaction of the non-monetary cashless transactions when a respective second class of transaction has been previously approved to perform with the at least one transaction-type device;
associating a respective first unique identifier with at least a portion of approved monetary cashless transactions;
associating a respective second unique identifier with at least a portion of approved non-monetary cashless transactions; and
settling at least the portion of the approved monetary cashless transactions via at least one vend settlement server; and
settling at least the portion of the approved non-monetary cashless transactions via the at least one vend settlement server.

* * * * *